Patented Jan. 11, 1927.

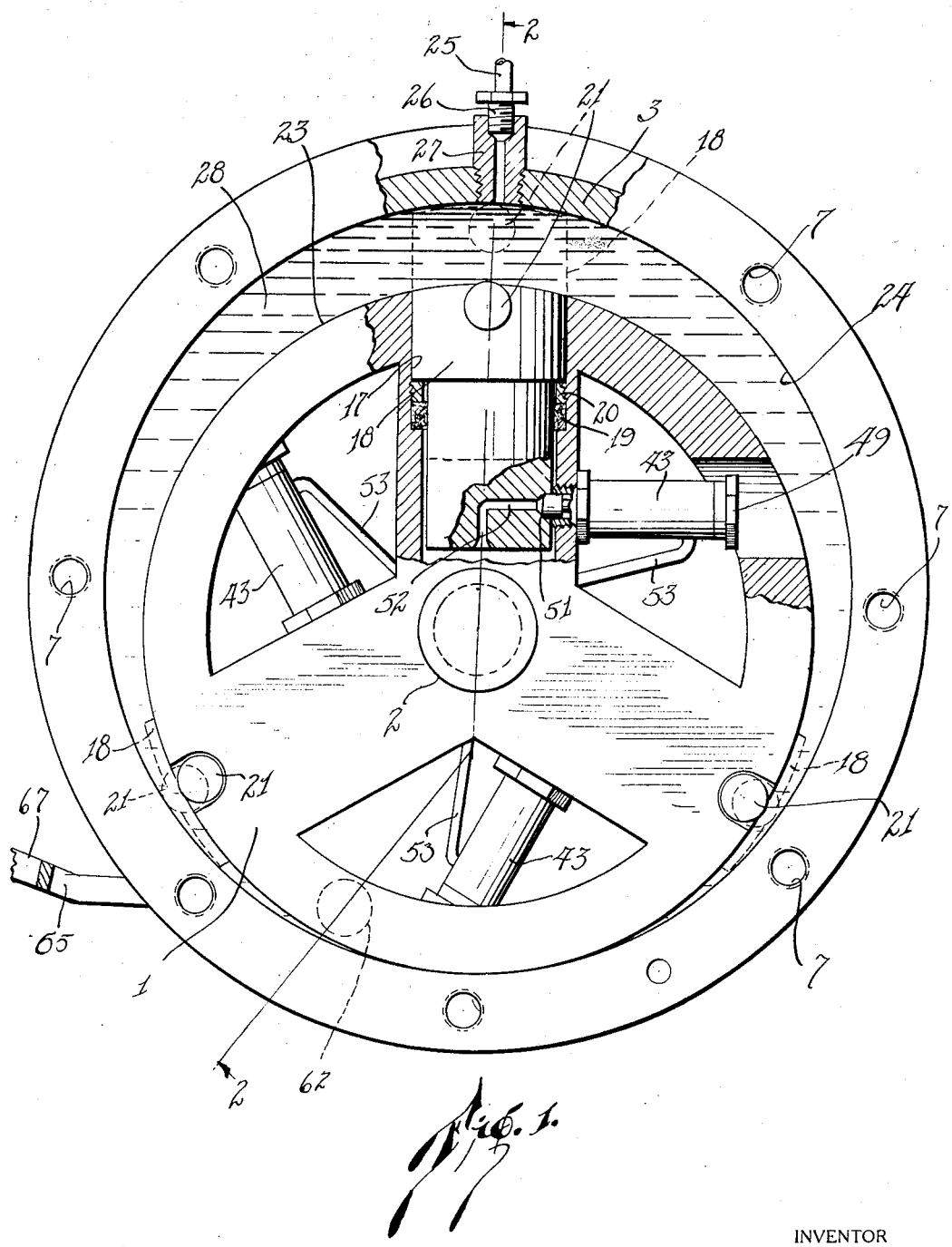

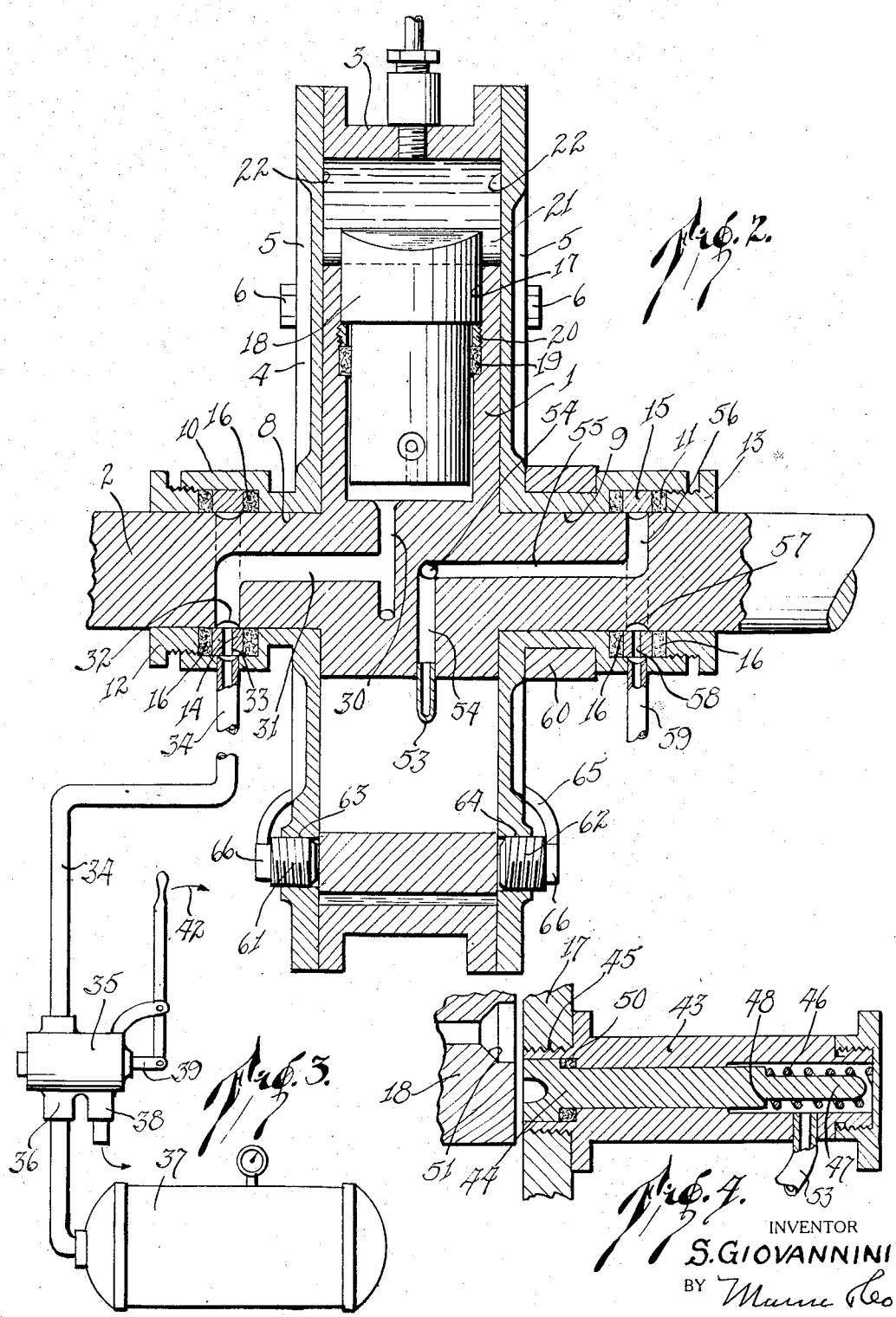

1,614,119

UNITED STATES PATENT OFFICE.

SEBASTIAN GIOVANNINI, OF CHICAGO, ILLINOIS.

BRAKE FOR MOTOR VEHICLES.

Application filed March 27, 1925. Serial No. 18,879.

My invention relates to improvements in brakes for motor vehicles, and it consists in the combinations, constructions, and arrangements herein described and claimed.

An object of my invention is to provide a brake for motor vehicles or the like in which there is no positive engagement of the moving elements of the brake with one another which necessarily submits the parts to enormous strain, and which often causes the brakes to set too quickly. My improved brake employs a fluid medium between the cooperating elements of the brake.

A further object of my invention is to provide a brake of the character described which may be set very gradually or quickly, but in no instance may the brake be set with an abupt stop of the movable element which would cause discomfiture of the occupants of the vehicle, upon which the brake is used as well as mechanical strain upon the parts.

A further object of my invention is to provide a brake of the character described in which novel means is employed for controlling the application and release of the brake.

A further object of my invention is to provide a brake of the character described which is durable in construction, compact in form, and thoroughly practical for the purposes intended.

Other objects and advantages will appear in the following specification, and the novel features of the invention will be particularly pointed out in the appended claims.

My invention is illustrated in the accompanying drawings, forming a part of this invention, in which—

Figure 1 is a side elevation of an embodiment of my invention with one end plate removed and partially in section, Figure 2 is a sectional view along the line 2—2 of Figure 1, Figure 3 is an elevation of the air operating means, and Figure 4 is a sectional view of a part of the mechanism illustrated in Figure 1.

In carrying out my invention I make use of a body member 1 having the shape illustrated in Figure 1. This body member 1 extends radially from a shaft 2 which may be the propeller shaft of a motor vehicle or one of the axle shafts. If the brake is to be applied to the axle shaft there must be a body member 1 on each of the rear axle shafts on either side of the differential. An annular casing 3 is provided of substantially the same width as the body member 1. End plates 4 and 5 are secured to the casing 3 by means of bolts 6 projected through the end plates and received in threaded openings 7 in the casing. The end plates 4 and 5 have eccentric bearing portions 8 and 9 respectively through which the shaft 2 extends.

The outermost portions 10 and 11 of the bearing portions 8 and 9 respectively have their inner walls disposed at a short distance from the wall of the shaft 2 (see Figure 2). The portions 10 and 11 have internal threads extending for a portion of their length for receiving threaded bearing bushings 12 and 13 respectively. Air conducting rings 14 and 15 are mounted concentric with the shaft 2 between the portions 10 and 11 and the bearing bushings 12 and 13 respectively. Suitable packing 16 is employed between the side walls of the rings 14 and 15 and the adjacent parts of the portions 10 and 11 respectively and the bushings 12 and 13 respectively.

The body member 1 (see Figure 1) is provided with three cylinder portions 17 having their axes extending radially from the center of the shaft 2. Each of these cylinders 17 has a piston 18 disposed therein. Suitable packing 19 with a packing ring 20 is provided for each of the cylinders 17 to prevent the leakage of air from the space beneath the piston. Each of the pistons 18 has a roller 21 rotatably mounted thereon having its axis parallel with the shaft 2 and extending to and barely contacting with the inner walls 22 of the end plates 4 and 5 respectively. The peripheral wall of the rollers 12 lies slightly beyond the peripheral wall 23 of the body member 1 so that when the pistons 18 are forced to the position shown in dotted lines in Figure 1 as by the application of compressed air beneath the pistons, the rollers alone will engage with the inner wall 24 of the casing 3.

An oil conducting pipe 25 is connected by means of a coupling 26 to a threaded tubular plug 27 which is projected through the upper wall of the casing 3. Thus oil 28 may be admitted under pressure through the pipe 25 to that space between the body member 1 and the casing 3, as shown in Figure 1. Means for admitting air under pressure to that point in the cylinder 17 beneath the piston 18 is provided in a passageway 30 communicating with each of the cylinders 17 beneath the pistons 18 and communicating with a longitudinal passageway 31 extending from the mid-point of the body member 1 to that point in registration with the ring 14. The passageway 31 further extends to the peripheral wall of the shaft 2 at that point in registration with the ring 14, and an annular groove 32 is provided on the peripheral wall of the shaft which is in registration with the ring 14 and which communicates with the passageway 31.

A bore 33 through the ring 14 provides means for admitting air to the passageway 31 through a pipe 34 projected through the portion 10 of the bearing member 8. This pipe 34 extends to a two-way valve member 35 (see Figure 3). The valve member 35 is connected by means of an inlet port 36 to an air tank 37 in which air is maintained under pressure. The valve 35 has an outlet port 38 through which air admitted to the valve 35 through the pipe 34 in a manner hereinafter described may escape when the valve stem 39 of the valve is in the position shown in Figure 3.

When a lever 40 associated with the stem 39 is moved in the direction of the arrow 42 and the valve stem 39 moved inwardly air is permitted to pass from the tank 37 through the valve and through the pipe 34 to the cylinders 17 by way of the passageways 31 and 30 as described.

Means for normally locking the pistons 18 in the position shown in Figure 1 so as to prevent the pistons from flying outwardly by centrifugal force when the shaft 2 is rotated is provided in a plunger 44 which is slidably disposed within a cylindrical casing 43. This casing 43 has an externally threaded neck portion 45 which is disposed in a threaded bore provided through one wall of the cylinder 17 at a point adjacent the lower end of the piston when the piston is in the position shown in Figure 1.

A compression spring 46 is disposed upon the plunger so as to encompass a reduced portion 47 thereof at the rearward end of the plunger. This compression spring bears against the plunger 44 at 48 and against a removable cap 49 which serves to close the outer or rearward end of the casing. A packing ring 50 is disposed within the bore of the casing 43 at the outermost end and within the neck portion 45. The bore of the casing at this point is enlarged as is the plunger 44 at its outermost end.

The piston 18 has a cavity 51 therein for receiving the outermost end of the plunger 44 when the piston is in the position shown in Figure 1. This cavity 51 communicates by means of a passage 52 with the inner end of the piston so that air admitted through the passageways 31 and 30 to the space beneath the piston may force the plunger 44 out of engagement with the cavity 51 and thus permit the piston to move to the position shown in dotted lines in Figure 1. In Figure 4 I have shown the piston 18 disengaged from the plunger 44 and partially projected from the cylinder 17.

A vent tube 53 communicates with the rear or innermost end of the casing 43 at one end and with passageways 54 extending radially through the body member 1 which in turn communicates with a longitudinal passage 55 similar to the passage 31. This passage 55 communicates with a radial passage 56 which radial passage comunicates with an annular groove 57 which encompasses the peripheral wall of the shaft 2 similar to the groove 32. The groove 57 is in registration with the ring 15 which ring has a passage 58 therethrough registering with an outlet or exhaust tube 59 through which air from the point at the rear of the plunger 44 may pass, thus permitting the plunger 44 to be quickly retracted without any possibility of the compression of air at the rear of the plunger, and also to accommodate any pressure which may pass the packing 50.

The casing 3 with the end plates 4 and 5 may be secured to the chassis of a motor vehicle as by means of a bracket 60 which encompasses the bearing portion 9, or any other suitable means which will maintain the casing against rotation. Means for stopping rotation of the body member 1 and thence the shaft 2 as in emergency is provided in a pair of threaded shafts 61 and 62 which are projected through threaded bores 63 and 64 extending transversely through the end plates 4 and 5 respectively. The threads on the shaft 61 are right-hand threads, while those on the shaft 62 are left-hand threads.

A bifurcated member 65 has the outermost ends of its branches secured at 66 to the shafts 61 and 62 respectively. This bifurcated member has an arm portion 67 extending longitudinally therefrom which when moved as in the manner of a hand lever, will cause the shafts 61 and 62 to be rotated and to frictionally engage with the side walls of the body member 1.

From the foregoing description of the various parts of the device, the operation thereof may be readily understood. Oil is admitted under pressure to that space surrounding the body member 1 within the casing 3 through the oil tube 25. The device is then ready for use.

Let us assume that the vehicle upon which my improved brake is installed is moving along the road and hence the axle shaft 2 is rotating. At this time the pistons 18 are in the position shown in Figure 1, and locked against movement from centrifugal force by means of the plungers 44. If now it is desired to stop the vehicle, the lever 40 is moved in the direction of the arrow 42. This causes the valve stem 39 to move inwardly and to permit air under pressure from the tank 37 to pass through the valve 35, through the air tube 34, through the passage 33 in the ring 14 by way of the annular groove 32 through the passages 31 and 30 to that point beneath the pistons 18. As the pistons 18 are locked at this time against radial movement by means of the plungers 44, the air which is under pressure will pass through the passages 42 and force the plungers 44 against the force of the spring 46 out of engagement with the cavities 51 in the pistons. Thus the pistons will assume the position shown in dotted lines in Figure 1.

Bearing in mind that the body member 1 is rotating at this time with the axle shaft 2, it is apparent that the oil 28 will resist rotation of the body member since the rollers 21 engage with the inner wall of the casing 3 and thus virtually close a portion of the space between the casing and the peripheral wall of the cylinder. I have reference at this instant to the roller 21 associated with the piston 18 shown in full lines in Figure 1. A portion of the oil may pass beneath the roller 21 and as the body member continues to rotate the roller will practically entirely shut off passage of the oil 28 beyond the roller. Thus the oil sets up great resistance to the rotation of the body member 1, which resistance increases as the rollers approach the lowermost end of the casing where the body member is practically touching the casing.

As the moving vehicle has a certain amount of momentum, it is apparent that the point of resistance between the oil and the moving body member will have reached its maximum, cause the pistons to slightly retract within the cylinders 17 against the air pressure, and permit some of the oil to pass the roller. If the valve 35 is then opened to its full extent and the pressure of the air increased, the resistance to rotation of the body member 1 is naturally increased.

When the vehicle has been brought to a standstill or reduced in speed as desired and the driver wishes to release the brake, he has merely to move the lever 40 back to the position shown in full lines in Figure 3. This will relieve air pressure beneath the pistons 18 and the rotation of the body member 1 will cause the pistons to move to the position shown in full lines in Figure 1. The spring 46 will force the plungers 44 in engagement with the cavities 51 as the pistons move so that the cavities register with the plungers and the device is again in its normal inoperative position.

While I have described the apparatus as being applicable for use as a brake, it is obvious that without any change in the construction it could be used as a clutch or for transmission purposes.

I claim:
1. A brake of the character described comprising a casing, a shaft rotatably mounted in said casing projecting exteriorly of said casing, a body member carried by said shaft within said casing, the axis of said shaft and said body member being eccentric with respect to the axis of said casing, pistons adapted for projection radially from said body member so as to contact the inner wall of said casing, a fluid in the space between said body member and said casing, and resilient means for projecting said pistons radially from said body member at will.

2. A brake of the character described comprising a casing, a shaft rotatably mounted in said casing projecting exteriorly of said casing, a body member carried by said shaft within said casing, the axis of said shaft and said body member being eccentric with respect to the axis of said casing, pistons adapted for projection radially from said body member so as to contact the inner wall of said casing, a fluid in the space between said body member and said casing, and manually controlled resilient means for projecting said pistons radially from said body member at will.

3. A brake of the character described comprising a casing, a shaft rotatably mounted in said casing projecting exteriorly of said casing, a body member carried by said shaft within said casing, the axis of said shaft and said body member being eccentric with respect to the axis of said casing, pistons adapted for projection radially from said body member so as to contact the inner wall of said casing, a fluid in the space between said body member and said casing, resilient means for projecting said pistons radially from said body member at will, and means for normally locking said pistons against projection from said body member as by centrifugal force.

4. A brake of the character described comprising a casing, a shaft rotatably mounted in said casing projecting exteriorly of said casing, a body member carried by said shaft within said casing, the axis of said shaft and said body member being eccentric with respect to the axis of said casing, pistons adapted for projection radially from said body member so as to contact the inner wall of said casing, a fluid in the space between said body member and said casing, manually controlled resilient means for projecting said pistons radially from said body member at will, and means for normally locking said pistons against projection radially from said body member as by centrifugal force.

5. A brake of the character described comprising a casing, a shaft rotatably mounted in said casing projecting exteriorly of said casing, a body member carried by said shaft within said casing, the axis of said shaft and said body member being eccentric with respect to the axis of said casing, pistons adapted for projection radially from said body member so as to contact the inner wall of said casing, a fluid in the space between said body member and said casing, resilient means for projecting said pistons radially from said body member at will, and yielding means for engaging with said pistons to stop said pistons from radial movement outwardly from said body member when said resilient means for actuating said pistons is inoperative.

6. A brake of the character described comprising a casing, a shaft rotatably mounted in said casing projecting exteriorly of said casing, a body member carried by said shaft within said casing, the axis of said shaft and said body member being eccentric with respect to the axis of said casing, pistons adapted for projection radially from said body member so as to contact the inner wall of said casing, a fluid in the space between said body member and said casing, and manually controlled resilient means for projecting said pistons radially from said body member at will, said casing being adapted for disposition upon the chassis of a motor vehicle and said shaft being adapted for association with the drive wheels of said vehicle.

7. A brake of the character described comprising a casing, a shaft rotatably mounted in said casing projecting exteriorly of said casing, a body member carried by said shaft within said casing, the axis of said shaft and said body member being eccentric with respect to the axis of said casing, pistons adapted for projection radially from said body member so as to contact the inner wall of said casing, a fluid in the space between the body member and said casing, and pneumatic means for projecting said pistons radially from said body member at will.

8. A device of the character described comprising a casing, a shaft rotatably mounted in said casing projecting exteriorly of said casing, a body member carried by said shaft within said casing, the axis of said shaft and said body member being eccentric with respect to the axis of said casing, pistons adapted for projection radially from said body member so as to contact the inner wall of said casing, a fluid in the space between said body member and said casing, and resilient means for projecting said pistons radially from said body member at will.

SEBASTIAN GIOVANNINI.